United States Patent
Herrera-Yagüe et al.

(10) Patent No.: US 9,363,283 B1
(45) Date of Patent: Jun. 7, 2016

(54) SYSTEMS AND METHODS FOR REPUTATION SCORING

(71) Applicant: Traitperception Inc., Menlo Park, CA (US)

(72) Inventors: Carlos Herrera-Yagüe, Madrid (ES); Antonio Prada, Madrid (ES); Jose I. Fernández-Villamor, Madrid (ES); Juan Cartagena, Madrid (ES)

(73) Assignee: Traitperception Inc., Menlo Park, CA (US)

(*) Notice: Subject to any disclaimer, the term of this patent is extended or adjusted under 35 U.S.C. 154(b) by 0 days.

(21) Appl. No.: 14/755,801

(22) Filed: Jun. 30, 2015

(51) Int. Cl.
*G06F 21/00* (2013.01)
*H04L 29/06* (2006.01)
*G06F 21/50* (2013.01)
*H04L 29/08* (2006.01)
*G06F 15/173* (2006.01)

(52) U.S. Cl.
CPC ............ *H04L 63/1425* (2013.01); *G06F 21/50* (2013.01); *H04L 65/403* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 7,673,003 | B2 * | 3/2010 | Little, II | G06Q 10/107 709/204 |
| 8,386,564 | B2 * | 2/2013 | Pennington | G06Q 30/02 709/203 |
| 8,484,730 | B1 * | 7/2013 | P. R. | G06F 11/3438 709/225 |
| 8,549,651 | B2 * | 10/2013 | Callahan | H04L 63/105 705/319 |
| 8,793,778 | B2 * | 7/2014 | Marinov | G06F 21/31 382/296 |
| 2007/0179834 | A1 * | 8/2007 | Carter | G06Q 30/0201 705/7.29 |
| 2007/0282987 | A1 * | 12/2007 | Fischer | G06Q 10/10 709/223 |
| 2008/0189164 | A1 * | 8/2008 | Wiseman | G06Q 20/3674 705/67 |
| 2008/0189768 | A1 * | 8/2008 | Callahan | H04L 63/105 726/4 |
| 2009/0006115 | A1 * | 1/2009 | Schwarz | G06Q 30/06 705/348 |
| 2009/0187988 | A1 * | 7/2009 | Hulten | H04L 63/102 726/22 |
| 2010/0293016 | A1 * | 11/2010 | Spektor | G06F 21/316 705/7.28 |
| 2010/0325040 | A1 * | 12/2010 | Etchegoyen | G06F 21/31 705/39 |

(Continued)

*Primary Examiner* — Abu Sholeman
*Assistant Examiner* — Maung Lwin
(74) *Attorney, Agent, or Firm* — Christopher J. McKenna; Shabbi S. Khan

(57) ABSTRACT

Systems and methods of the present disclosure are directed to providing a digital reputation score. The server can generate a first reputation score of a user based on the user's online activity, identity verification, and online transaction history. The server can identify, from the user's online account, a first set of online accounts with which the user established a unidirectional trust relationship from the user to the first set of online accounts. The server can identify, from the user's online account, a second set of online accounts with which the user established a unidirectional trust relationship from the user to the second set of online accounts. The server can generate a second reputation score based on the first number and second number of trust relationships from the first set and second set of online accounts respectively. The server can generate a third reputation using the first and second reputation scores.

20 Claims, 8 Drawing Sheets

(56) References Cited

U.S. PATENT DOCUMENTS

| | | | | |
|---|---|---|---|---|
| 2011/0113098 A1* | 5/2011 | Walsh | G06Q 10/00 | 709/204 |
| 2012/0246720 A1* | 9/2012 | Xie | H04L 51/12 | 726/22 |
| 2013/0042298 A1* | 2/2013 | Plaza Fonseca | G06F 21/335 | 726/1 |
| 2015/0032487 A1* | 1/2015 | Shoen | G06Q 10/02 | 705/5 |
| 2015/0101008 A1* | 4/2015 | Zent | H04L 63/20 | 726/1 |
| 2015/0128240 A1* | 5/2015 | Richards | H04L 63/0861 | 726/7 |
| 2015/0163217 A1* | 6/2015 | Lo | H04L 63/0823 | 726/6 |
| 2015/0222606 A1* | 8/2015 | Yan | H04L 9/0847 | 713/171 |

* cited by examiner

SYSTEMS AND METHODS FOR REPUTATION SCORING

FIELD OF THE DISCLOSURE

The present solution is generally directed to providing a reputation score. In particular, the present solution generates a reputation score based on unidirectional trust relationships among online accounts.

BACKGROUND OF THE DISCLOSURE

In the recent past, people have created online identities by establishing social networking profiles, email addresses, among other online accounts. These online accounts are easy to establish. Some people may create online accounts to participate in activities and transactions that they would otherwise not participate in if their real-world identity was associated.

BRIEF SUMMARY OF THE DISCLOSURE

Systems and methods of the present solution are directed to providing a reputation score. In some embodiments, the present solution can determine a total reputation score based on: (1) an intrinsic reputation score and (2) a network reputation score. The intrinsic reputation score may be based on the reputation from the user himself or herself. There may be three factors that are taken into account for the intrinsic reputation score: (i) online activity, (ii) identity, and (iii) transactions. Online activity may include the duration of the user's online presence and the number of other users that the user is associated with. Identity may include the identity of the user as inferred, for example, from the user's email address, government-issued identification, or phone verification, among others. Transactions may include reviews and ratings associated with online transaction made by the user. The intrinsic reputation score and the three factors thereof may take into account temporal component. For example, the value of the intrinsic reputation score determined from transactions may decrease after the user conducts fraudulent transactions. In another example, the value of the intrinsic reputation score may decrease over time based on a negative exponential function.

Network reputation score may be based on the trust relationship between the user and other entities. Network reputation score may be determined based on reputation increases and reputation decreases. Reputation increases may signify the gain to network reputation based on the number of trusters that the user is associated with. Reputation decreases, on the other hand, may signify the risk of a user in trusting another user, and may be based on the number of people that the user trusts and may depend on time. For example, if a user trusts another user and afterward the other user receives a poor review on a transaction, the network reputation of the first user may also be reduced. The total reputation score may be based on the intrinsic reputation score and the network reputation score. For example, the total reputation score may be a sum of the intrinsic reputation score and the network reputation score.

At least one aspect of the present solution is directed to a method of generating a digital reputation score. The method can be performed or executed by a server having one or more processors. The server can generate a first reputation score of a user based on online activity associated with the user, identity verification of the user and online transaction history of the user. The server can identify, from a first online account of the user of a plurality of online accounts maintained by the server, a first set of online accounts of the plurality of online accounts with which the first online account established, responsive to one or more first requests received by the server, a unidirectional trust relationship from the first online account to each respective online account of the first set of online accounts. The server can identify, from the first online account of the first user, a second set of online accounts that have established, via the server, responsive to one or more second requests received by the server, unidirectional trust relationships from each respective online account of the second set of online accounts to the first online account. The server can generate, for the first online account of the user, a second reputation score based on a first number of trust relationships established with the first set of online accounts and a second number of trust relationships established with the second set of online accounts. The server can generate, for the first online account of the user, a third reputation score using the first reputation score of the user and the second reputation score of the user.

In some embodiments, generating the first reputation score can include identifying one or more other accounts maintained by one or more other server and determining, using information associated with the one or more other accounts, a first component score used to generate the first reputation score. In some embodiments, determining, using information associated with the one or more other accounts, the first component score used to generate the first reputation score can include determining a length of time for which the one or more of the other accounts have been established and determining a number of online accounts with which each of the one or more other accounts has interacted. In some embodiments, generating the first component score can include applying a slow increasing function to the determined length of time or the number of online actions with which an online account has interacted to counter-measure high variance in the determined length of time or the number of online actions across different online accounts.

In some embodiments, generating the first reputation score can include identifying a domain name of an email address provided by the user. In some embodiments, generating the first reputation score can include determining that the domain name belongs to an entity that satisfies a predetermined criteria. In some embodiments, generating the first reputation score can include responsive to determining that the domain name belongs to an entity that satisfies a predetermined criteria, generating a second component score used to generate the first reputation score.

In some embodiments, generating the first reputation score can include receiving a first image of a government-issued ID of the user that includes the user's face. In some embodiments, generating the first reputation score can include identifying, from the government-issued ID, data representative of the face of the user. In some embodiments, generating the first reputation score can include receiving, via a video file, a second image including the face of the user. In some embodiments, generating the first reputation score can include comparing features of the user's face from the first image to features of the face of the user included in the second image. In some embodiments, generating the first reputation score can include increasing a value of a second component score responsive to determining that the user's face included in the first image matches the face of the user in the second image.

In some embodiments, generating the first reputation score can include receiving, via one or more networks, data corresponding to online accounts of the users maintained by a plurality of other servers corresponding to other entities, the data representative of one or more online transactions performed by the user. In some embodiments, generating the first reputation score can include determining, using the received data, a third component score to generate the first reputation score.

In some embodiments, the server can determine, for each of the first set of online accounts and the second set of online accounts, a respective second reputation score. In some embodiments, the server can determine the second reputation score of the first online account using the second reputation scores of each of the first set of online accounts and the second set of online accounts. In some embodiments, the second reputation score of each of the first set of online accounts and the second set of online accounts can be weighted according to a function of time. In some embodiments, the server can update the third reputation score responsive to determining that a second reputation score of an online account of the first set of online accounts has decreased.

At least one aspect of the present solution is directed to a system of generating a digital reputation score. The system can include a server maintaining a plurality of online accounts in a database. The server can be configured to generate a first reputation score of a user based on online activity associated with the user, identity verification of the user and online transaction history of the user. The server can be configured to identify from a first online account of the user of the plurality of online accounts, a first set of online accounts of the plurality of online accounts with which the first online account, established, responsive to one or more first requests received by the server, a unidirectional trust relationship from the first online account to each respective online account of the first set of online accounts. The server can be configured to identify, from the first online account of the first user, a second set of online accounts that have established, via the server, responsive to one or more second requests received by the server, unidirectional trust relationships from each respective online account of the second set of online accounts to the first online account. The server can be configured to generate, for the first online account of the user, a second reputation score based on a first number of trust relationships established with the first set of online accounts and a second number of trust relationships established with the second set of online accounts. The server can be configured to generate, for the first online account of the user, a third reputation score using the first reputation score of the user and the second reputation score of the user.

In some embodiments, generating the first reputation score can include identifying or more other accounts maintained by one or more other server and determining, using information associated with the one or more other accounts, a first component score used to generate the first reputation score. In some embodiments, determining, using information associated with the one or more other accounts, a first component score used to generate the first reputation score can include determining a length of time for which the one or more of the other accounts have been established and determining a number of online accounts with which each of the one or more other accounts has interacted. In some embodiments, generating the first component score can include applying a slow increasing function to the determined length of time or the number of online actions with which an online account has interacted to counter-measure high variance in the determined length of time or the number of online actions across different online accounts.

In some embodiments, generating the first reputation score can include identifying a domain name of an email address provided by the user. In some embodiments, generating the first reputation score can include determining that the domain name belongs to an entity that satisfies a predetermined criteria. In some embodiments, generating the first reputation score can include responsive to determining that the domain name belongs to an entity that satisfies a predetermined criteria, generating a second component score used to generate the first reputation score.

In some embodiments, generating the first reputation score can include receiving first image of a government-issued ID of the user that includes the user's face. In some embodiments, generating the first reputation score can include identifying, from the government-issued ID, data representative of the face of the user. In some embodiments, generating the first reputation score can include receiving, via a video file, a second image including the face of the user. In some embodiments, generating the first reputation score can include comparing features of the user's face from the first image to features of the face of the user included in the second image. In some embodiments, generating the first reputation score can include increasing a value of a second component score responsive to determining that the user's face included in the first image matches the face of the user in the second image.

In some embodiments, generating the first reputation score can include receiving, via one or more networks, data corresponding to online accounts of the users maintained by a plurality of other servers corresponding to other entities, the data representative of one or more online transactions performed by the user. In some embodiments, generating the first reputation score can include determining, using the received data, a third component score to generate the first reputation score.

In some embodiments, the server can be configured to determine, for each of the first set of online accounts and the second set of online accounts, a respective second reputation score. In some embodiments, the server can be configured to determine the second reputation score of the first online account using the second reputation scores of each of the first set of online accounts and the second set of online accounts. In some embodiments, the second reputation score of each of the first set of online accounts and the second set of online accounts can be weighted according to a function of time. In some embodiments, the server can be configured to update the third reputation score responsive to determining that a second reputation score of an online account of the first set of online accounts has decreased.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for reputation scoring.

A. Computing and Network Environment

Figure 1A:
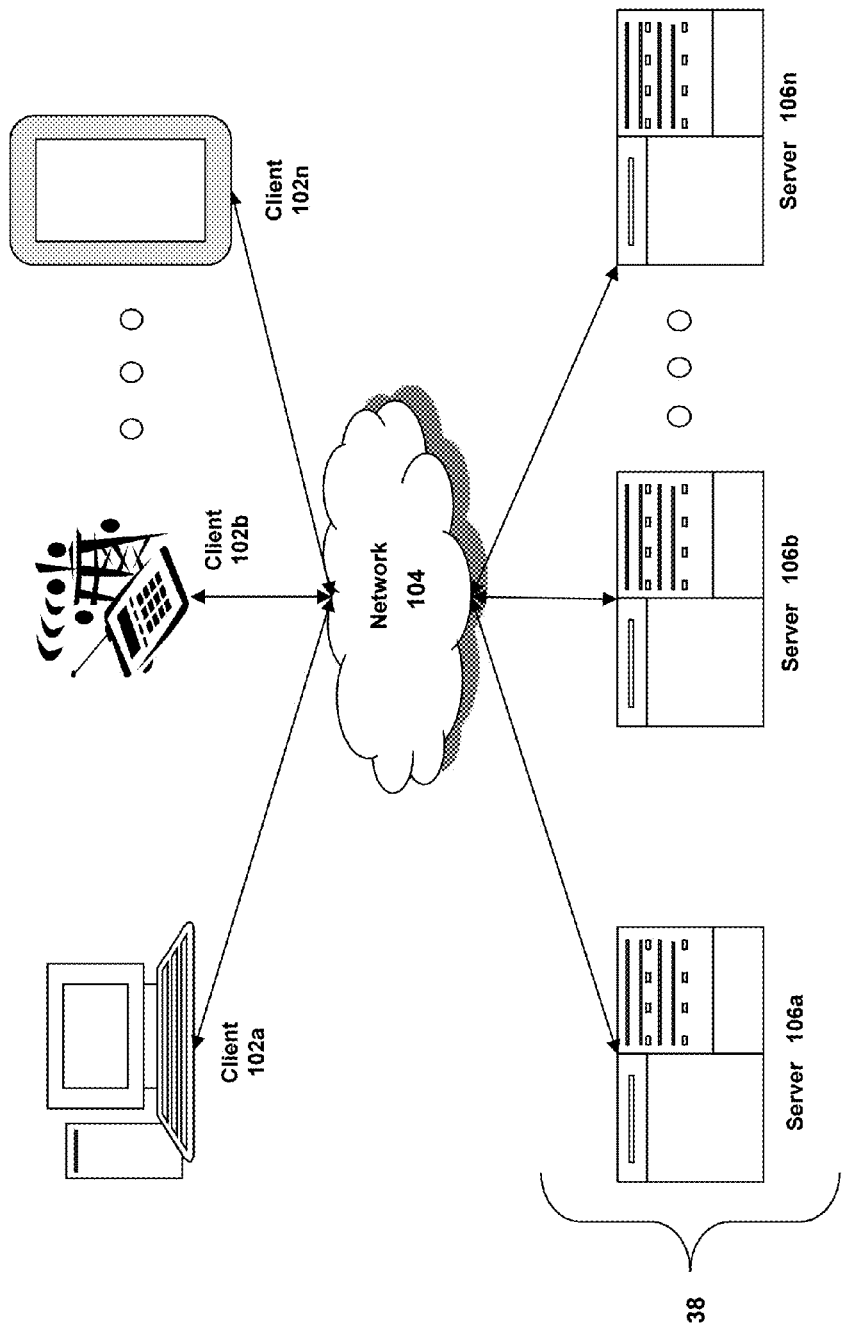
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
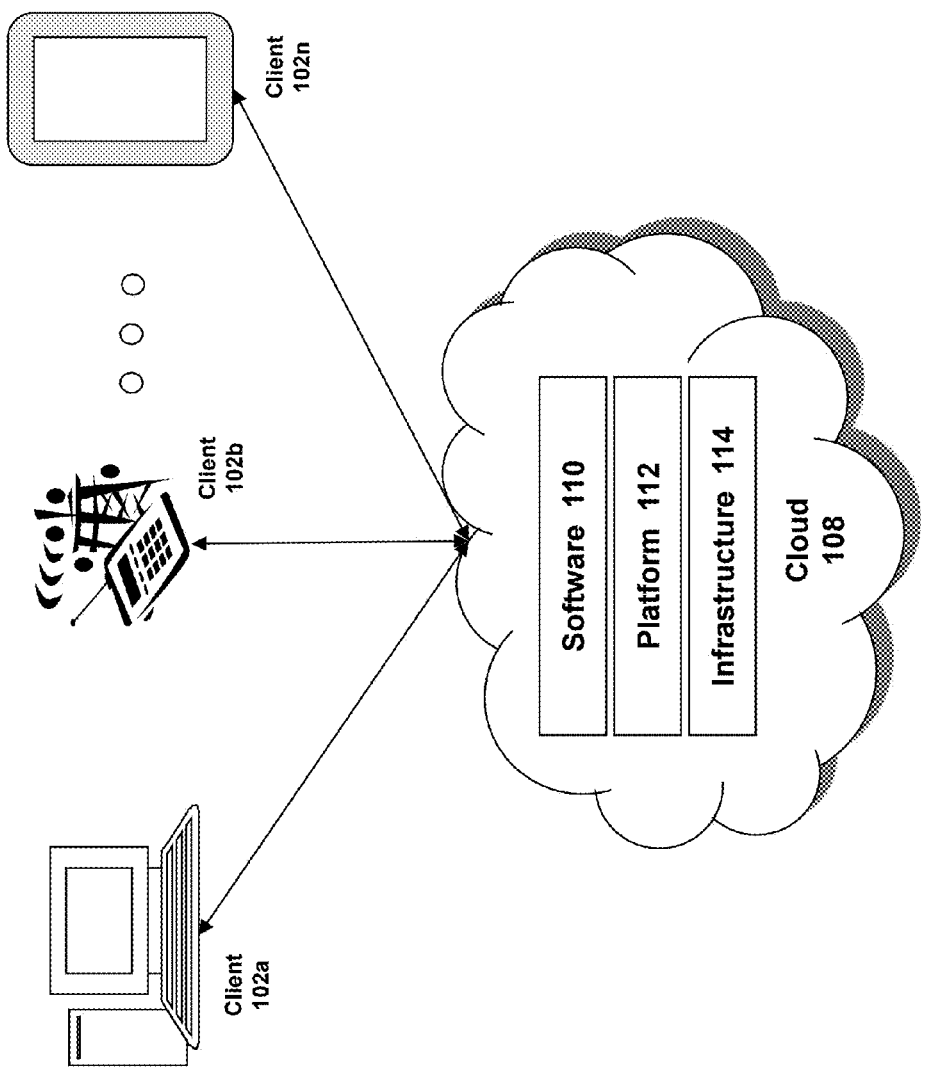
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
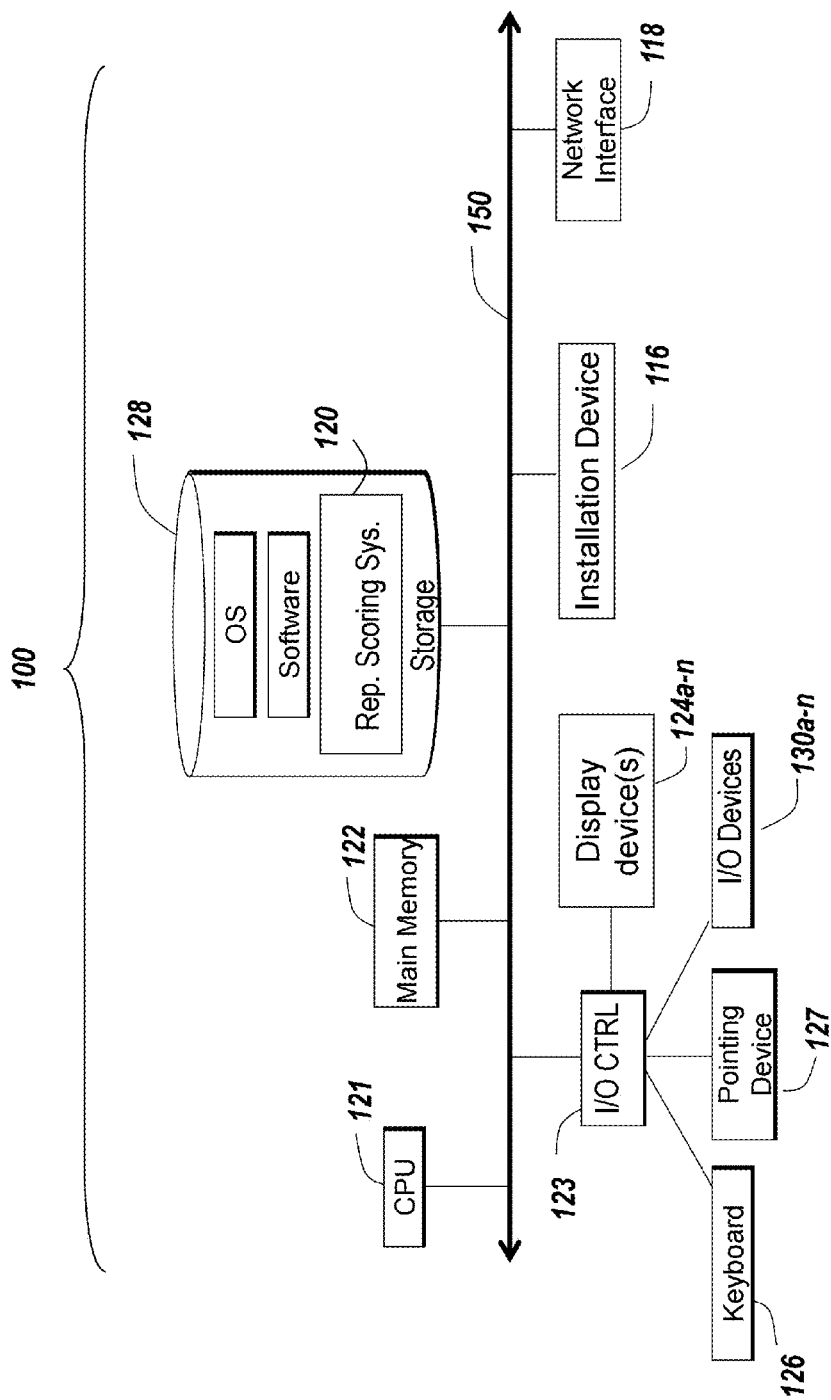
FIGS. 1C and 1D are block diagrams depicting embodiments of computing devices useful in connection with the methods and systems described herein.
Figure 1D:
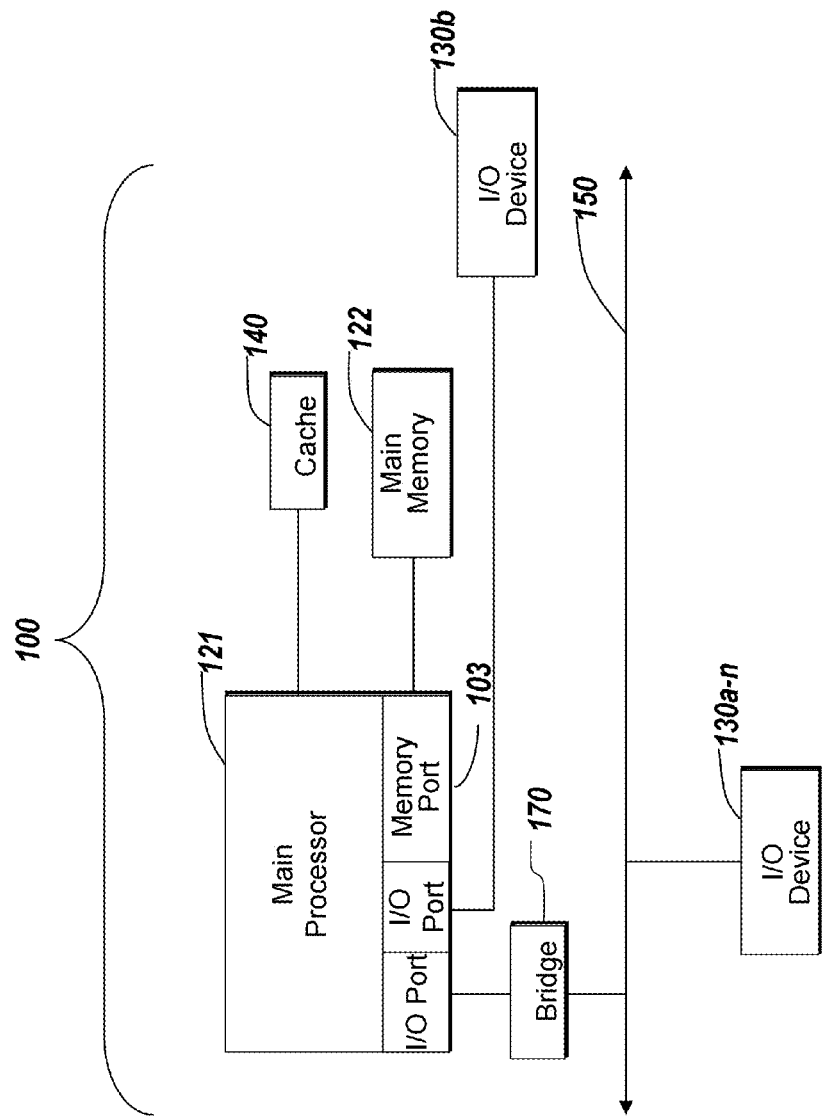

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a reputation scoring system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or Synch-Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the reputation scoring system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESS-CARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2022, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Reputation Scoring System

Oftentimes on the Internet, users may deal or otherwise interact with other users with whom the user may have never dealt or interacted before. This lack of prior interaction may be a source of anxiety for such users. A reputation scoring system can generate a digital reputation score of users for other users to gauge how reliable the user is. The digital reputation score may be based on two sources: (1) three-dimensional intrinsic reputation and (2) network reputation. Briefly, the three-dimensional intrinsic reputation can refer to the reputation a user gathers by providing information about themselves. Such information may include, for example, email addresses, passport verifications, online accounts on social media sites, transaction history in e-commerce, and sharing economy platforms. Network reputation can refer to the reputation a user gathers based on activity of other users, for example, by having other users explicitly declare that they trust the user.

The three-dimensional intrinsic reputation may be based on three dimensions: (i) online activity, (ii) identity, and (iii) transactions. Online activity may be associated with a variety of factors related to digital fingerprints. One of the more relevant factors may be how long the user can prove that the user has been online, for instance, by connecting accounts in major, well-known providers such as mainstream social sites or web-mail services. Another relevant factor that may be taken into account is the number of users the connected account has engaged with and how persistent the engagement is. In some embodiments, these input variables may present variance, typically with non-Gaussian, long-tailed distribution. To counter these artefacts, in some embodiments, the reputation scoring system can reduce such heterogeneity by applying slow increasing functions, such as a logarithmic function, so that the resulting distribution is not dramatically different whether the connected account has engaged 1,000 users or 1 million users, but it is very different for 5 versus 100 users.

Identity may be gathered from providing information that may signify whether the user is who the user indicates they are, because such information may be difficult to obtain. For example, if a user provides a phone number or email address, the reputation scoring system can attribute a higher score if the phone number or email address belongs to a well-known corporation or university. In some embodiments, the reputation scoring system can implement a two-step passport verification to verify a top level in identity. In such embodiments, the reputation scoring system can verify a digital copy of a government-issued ID and then match the face recognized from the picture of the government-issued ID with the voice recognized from the key-phrased recorded in the video or audio from phone verification.

Transactions may be gathered from reviews and ratings associated with online transactions on websites such as EBay, Airbnb, Uber, or Etsy, among others. To determine the raw ratings from various websites, the reputation scoring system can first normalize the raw ratings based on the overall reputation of the respective platform and then determine the reputation of the user within the platform. Transactions may take into account a temporal component. For example, the reputation scoring system can assign a lower transaction score when a person with previously excellent reviews starts to commit fraud on EBay. In another example, the influence of a particular rating may decrease over time.

Network reputation score may be based on the trust relationship between the user and other entities. Network reputation score may be determined based on reputation increases and reputation decreases. Reputation increases may signify the gain to network reputation based on the number of trusters that the user is associated with. Reputation decreases, on the other hand, may signify the risk of a user in trusting another user, and may be based on the number of people that the user trusts and may depend on time. For example, if a user trusts another user and afterward the other user receives a poor review on a transaction, the network reputation of the first user may also be reduced. The total reputation score may be based on the intrinsic reputation score and the network reputation score. For example, the total reputation score may be a sum of the intrinsic reputation score and the network reputation score.

To determine the network reputation score, the reputation scoring system can generate a trust network that includes a graph depicting trust relationships among various entities. Nodes in this graph may be restricted to represent natural persons, as opposed to corporations and institutions. The trust network may be considered as the projection of user space of a bipartite graph of institutions and individuals. The trust links may be unidirectional, since user A's trust of user B may not imply user B trusting user A. The existence of a trust link may imply a certain level of agreement between the two nodes, even if one user rejects the other. Furthermore, the graph may take into account, the cost of a social link. The cost may be related to the risk that if user A trusts user B and user B receives a bad review, user B's reputation may decrease as well as user A's reputation.

Figure 2:
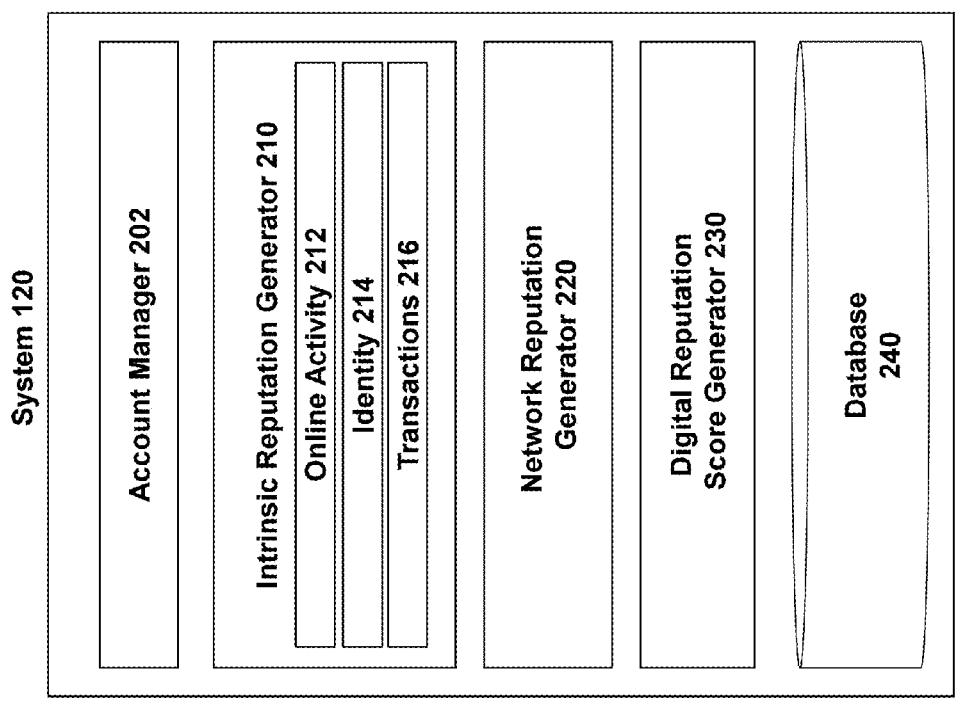
FIG. 2 is a block diagram depicting an embodiment of a system for generating a digital reputation score.

Referring now to FIG. 2, a block diagram depicting an embodiment of a system 120 for generating digital reputation scores is shown. In brief overview, the system 120 can include an account manager 202, an intrinsic reputation generator 210, a network reputation generator 220, a digital reputation score generator 230, and a database 240. The system 120 can include or interactive with one or more clients 102*a-n* (or client device 102), one or more servers 106*a-n* (or server 106). The account manager 202, the intrinsic reputation generator 210, the network reputation generator 220 and the digital reputation score generator 230 can each include one or more processing units or other logic devices such as programmable logic array engines, modules, or circuitry designed and constructed to facilitate generating a digital reputation score. In some implementations, the account manager 202, the intrinsic reputation generator 210, the network reputation generator 220 and the digital reputation score generator 230 can include a script, computer-executable instructions, a file, or other executable object that can be used to generate a digital reputation score of a user. The system 120 can include components 100 shown in FIG. 1C or FIG. 1D or be configured to operate as a service in cloud 108. The system 120 can include or interact with one or more servers 106*a-n* and clients 102*a-n*.

The account manager 202 can be configured to maintain accounts for one or more users of the reputation scoring system 120. The account manager 202 can maintain and manage accounts of the one or more users. The account manager 202 can store information pertaining to the accounts of the users in the database 240. Each account can include information of a respective user. In some implementations, the account manager 202 can be configured to register a user on the system 120. As part of the registration, the account manager 202 can receive information from the user identifying one or more online accounts of the user. The online accounts can pertain to accounts the user has established with a variety of different online websites, platforms, applications, among others. For instance, the user can identify one or more social networking accounts, one or more email addresses associated with email accounts, one or more websites, among others. The account manager 202 can retrieve account information from one or more of these accounts of the user. In some implementations, the account manager 202 may retrieve the information via application program interfaces (APIs). In some implementations, the account manager 202 can receive information from servers of websites or entities with which the user has accounts. The information can include information about the history of the user's account, transaction information of the account, online activity of the user via the account, as well as information relating to other users of the entity with which the user has a connection, among others.

In some embodiments, the account manager 202 can identify one or more other accounts maintained by one or more other servers 106*a-n*. For example, if a user maintains an account on FACEBOOK, LINKEDIN, TWITTER, and EBAY, the account manager 202 can identify the accounts on the servers 106*a-n* of FACEBOOK, LINKEDIN, TWITTER, and EBAY as belonging to and maintained by that user. In some implementations, the account manager 202 can identify or receive information relating to the user from each of the servers 106*a-n*. The information can include a list of contacts of the user, one or more online activities performed by the user at the respective server, one or more transactions performed by the user via the respective server, among others. The account manager 202 can store the information in the database 240 and may be configured to make the information accessible to each of the intrinsic reputation generator 210, the network reputation generator 220 and the digital reputation score generator 230.

The intrinsic reputation generator 210 can be configured to generate an intrinsic reputation score of the user. The intrinsic reputation generator 210 can generate the intrinsic reputation score of a user based on the information provided by the user or based on other online activity of the user that is accessible by the intrinsic reputation generator 210. In some implementations, the intrinsic reputation generator 210 can generate an intrinsic reputation score based on three dimensions, namely, online activity 212, identity 214 and transactions 216. In some embodiments, the intrinsic reputation score of the user may be a sum of an online activity score, an identity score, and an transaction score. In some embodiments, the intrinsic reputation score of the user may be a weighted sum of the online activity score, the identity score, and the transaction score.

In some embodiments, the intrinsic reputation generator 210 can determine a number of online accounts with which each of the one or more other accounts has interacted. In some embodiments, the intrinsic reputation generator 210 can aggregate the number of connections of the user from one or more accounts maintained by the one or more other servers 106a-n. For example, if a user has 1,500 connections on LinkedIn and 1,100 on FACEBOOK, the intrinsic reputation generator 210 can access the respective servers 106a-n and determine that the user is interacting with 2,600 other users by aggregating the number of connections accessed from the respective servers 106a-n. In some embodiments, the intrinsic reputation generator 210 can determine a length of time for which the one or more other accounts have been established. In some embodiments, the intrinsic reputation generator 210 can access the length of time for which the one or more other accounts have been established from the one or more accounts maintained by the one or more other servers 106a-n. For example, the intrinsic reputation generator 210 can determine that the user has established an account with LinkedIn 2 months ago by accessing either a database 240 or a server 106 of LinkedIn. In some embodiments, the intrinsic reputation generator 210 can determine the length of time for which the one or more other accounts have been established by accessing the date that the one or more other accounts have been established from the one or more other servers 106a-n. In some embodiments, the intrinsic reputation generator 210 can determine the length of time for which one or more accounts have been established by accessing the server of the entity with which the account was established and identifying activity of the account. For example, the intrinsic reputation generator 210 can, via the server of the entity providing the email address, identify that an email address of the user received its first email in January, 2010.

In some embodiments, the intrinsic reputation generator 210 can apply a slow increasing function to the determined length of time or the number of online actions with which an online account has interacted to counter-measure high variance in the determined length of time or the number of online actions across different online accounts. In some embodiments, the intrinsic reputation generator 210 can use a slow increasing function towards the number of accounts associated with the user to determine the online activity score. For example, the intrinsic reputation generator 210 can use a logarithmic function, such that the online activity score of a user account engaged with 1,000 other users is not much different from one engaged with 1 million other users but may differ greatly between a user account engaged with 5 other users versus 100 other users. In another example, the intrinsic reputation generator 210 can use a function of the following form:

$$\forall t > 0 \Rightarrow r(t)\frac{dt}{dr} < 0$$

where $r(t)=\alpha e^{\beta t}$, $\alpha>0$, and $\beta<0$, such that $\forall t_1, t_2>0$, $t_2 \gg t_1 \Rightarrow r(t_2) \ll r(t_1)$. In some embodiments, the intrinsic reputation generator 210 can apply the slow increasing function to the intrinsic reputation score. In some embodiments, the intrinsic reputation generator 210 can apply the slow increasing function to one or more of the online activity score, identity score, and transaction score.

The intrinsic reputation generator 210 can also be configured to generate the identity score of a user. The identity score of the user can indicate a level of verification of the user. Setting up an online account can be done fairly easily and generally is not tied to the natural person in the sense that someone may establish an online account pretending to be someone else. As such, the intrinsic reputation generator 210 can generate an identity score that can provide a metric that helps one determine how likely the person having the online account is the natural person they are presenting themselves online.

To generate an identity score, the intrinsic reputation generator 210 can verify whether the online accounts of the user maintained by servers of various online platforms are tied to the natural person associated with the user of the reputation scoring system. In some embodiments, the intrinsic reputation generator 210 can identify a domain name of an email address provided by the user. In some embodiments, the intrinsic reputation generator 210 can determine that the domain name belongs to an entity that satisfies a predetermined criteria. The predetermined criteria can specify types of entities, such as universities, corporations, among other entities. For example, if the predetermined criteria specifies "efg_corporation.com" and the email address provided by the user is "john_doe@efg_corporation.com," the intrinsic reputation generator 210 can determine that the email address belongs to "EFG Corp." In some embodiments, the intrinsic reputation generator 210 can, responsive to determining that the domain name belongs to an entity that satisfies the predetermined criteria, generate an identity score used to generate the intrinsic reputation score. The identity score may represent the identity measure of a user in the intrinsic reputation score. In some embodiments, the identity score may be dependent on the verifiability of the online account associated with the user. For example, a user with the email account "ABC@aol.com" may have a lower second component score than another user with the email account "DEF@furniture_dealer.com" because the email account "ABC@aol.com" may not be tied to a particular entity or organization.

In some embodiments, the intrinsic reputation generator 210 can establish or otherwise confirm the identity of a particular online user. In some embodiments, In some embodiments, the intrinsic reputation generator 210 can confirm the identity of a particular online user by comparing features of an image included in a government-issued ID with features of an image received from the user. In some embodiments, the intrinsic reputation generator 210 can receive a first image of a government-issued ID of the user. A government-issued ID can include a passport, driver's license, fishing license, military IDs, or any other suitable identification issued by a government with a face appearing on one side. In some embodiments, the government-issued ID of the user can include the user's face. In some embodiments, the intrinsic reputation generator 210 can identify, from the government-issued ID, data representative of the face of the user. For example, once the government-issued ID is scanned, the intrinsic reputation generator 210 can identify the face of the user on a government-issued ID by using pattern recognition algorithms such as principal component analysis, linear discriminate analysis, and feature identification analysis, among others. In some embodiments, the intrinsic reputation generator 210 can receive, via a video file, a second image. In some embodiments, the second image can include the face of the user. In some embodiments, the intrinsic reputation generator 210 can compare features of the user's face from the first image to features of the face of the user included in the second image. For example, once the first image and the second image has been acquired, the intrinsic reputation generator 210 can compare the features of the user's face from the first image to the features of the second image using feature detection algorithms and then applying nearest neighbor algorithms to determine the similarity of the features of the user's face between the first image and the second image. In some embodiments, the intrinsic reputation generator 210 can increase a value of a second component score, responsive to determining that the use's face included in the first image matches the face of the user in the second image.

In some embodiments, the intrinsic reputation generator 210 can determine the transactions score used for the intrinsic reputation score based on online transactions performed by the user. Online transactions can include, for example, purchases of goods or services, returns, and reviews and ratings of such transactions, among others. In some embodiments, the intrinsic reputation generator 210 can receive data corresponding to online accounts of the users maintained by a plurality of other servers 106a-n corresponding to other entities. The data can include data representative of one or more online transactions performed by the user. For example, Amazon.com may maintain online transaction data corresponding to online accounts of users on one or more servers 106a-n. In this example, Amazon.com, responsive to a request from the intrinsic reputation generator 210, can transmit the online transaction data to the intrinsic reputation generator 210. In some embodiments, the intrinsic reputation generator 210 can determine the transactions score of the user using the received data. The transactions score may represent the online transactions made by the user. For example, a user that has mostly favorable reviews regarding the user's sales of goods to others may have a higher transactions score. In contrast, a user that has mostly negative reviews regarding the user's sale of goods to others (such as descriptions of the user's poor quality or fraudulent transactions) may have a lower transactions score.

The network reputation generator 220 can be configured to determine a network reputation of users of the reputation scoring system. The network reputation of a user can be based on trust relationships established by servers of the reputation scoring system. The trust relationships are unidirectional. The network reputation score of a user is based in part on the number of users that trust the user, the number of users that the user trusts, and the network reputation score of each of the other users in the reputation scoring system. A user that establishes, via the server, a unidirectional trust relationship to other users can be referred to as a truster of the other users. Conversely, users that establish, via the server, a unidirectional trust relationship to the first user can be referred to as trusters of the first user.

The network reputation generator 220 can identify, from a first online account of the user, a first set of online accounts with which the first online account established, via the server, a unidirectional trust relationship to each respective online account of the first set of online accounts. In some embodiments, the reputation scoring system may establish a unidirectional trust relationship from the first online account to the first set of online accounts in response to the reputation scoring system receiving one or more requests to establish a unidirectional trust relationship from the first online account to each of the first set of online accounts. The unidirectional trust relationships from each respective online account of the second set of online accounts of the first online account can be defined to include relationships between natural persons. The server can identify an account of the first online user and determine a number of second users with which the first online user has established a unidirectional trust relationship. The server can establish unidirectional trust relationships from the first user to a second user responsive to receiving a request to establish a unidirectional trust relationship from the first user. Here, the network reputation generator 220 can identify the users to which the first user is identified as a truster.

The network reputation generator 220 can identify, from the first online account of the first user, a second set of online accounts that established unidirectional trust relationships from each respective online account of the second set of online accounts to the first online account. The network reputation generator 220 can identify an account of the first online user and determine, from the account of the first online user, a number of second users that have established, via the server, a unidirectional trust relationship from the respective second user to the first user. Here, the network reputation generator 220 can identify the trusters of the first user. The network reputation generator 220 can establish unidirectional trust relationships from the respective second users to the first user in response to receiving a request to establish a unidirectional trust relationship from the respective second user.

The network reputation generator 220 can generate, for the first online account of the user, a network reputation score based on a first number of trust relationships established with the first set of online account and a second number of trust relationships established with the second set of online accounts. The network reputation score may represent the score of the user based on the user's network reputation. In some embodiments, the network reputation generator 220 can determine the second reputation score based on the reputation increase and reputation decrease of the user. The second reputation score may be, for example, in the following form:

$$N(u)=N^+(u)-N^-(u)$$

where $N^+(u)$ represents that the reputation increase and $N^-(u)$ represents the reputation decrease each for user u.

The reputation increase may, for example, be of the form:

$$N^+(u) = \sum_{l=1}^{L} \alpha^{-(l-1)} \left( \sum_{i=0}^{|T^{l+}(u)|} \frac{\max(I(t_i^+) - I(u), 0)}{(K^l - K^{l-1})|T^-(t_i^+)|} \right)$$

where $\alpha$ is greater than zero, $t_i^{l+}$ is a node that belongs to $T^{l+}(u)$, and K is the average degree of the network such that $K^l - K^{l-1}$ is the expected number of nodes in $T^{l+}(u)$. In this example, $T^{l+}(u)$ denotes the set of nodes that trust user u. $T^{l+}(u)$ may be defined to satisfy two conditions: that there is at least one directed path of length l in the trust network starting along the path of length l to the user u and that the nodes do not belong to any of the sets $\{T^{1+}, T^{2+}, \ldots T^{(N-1)+}\}$.

Figures 3A, 3B:
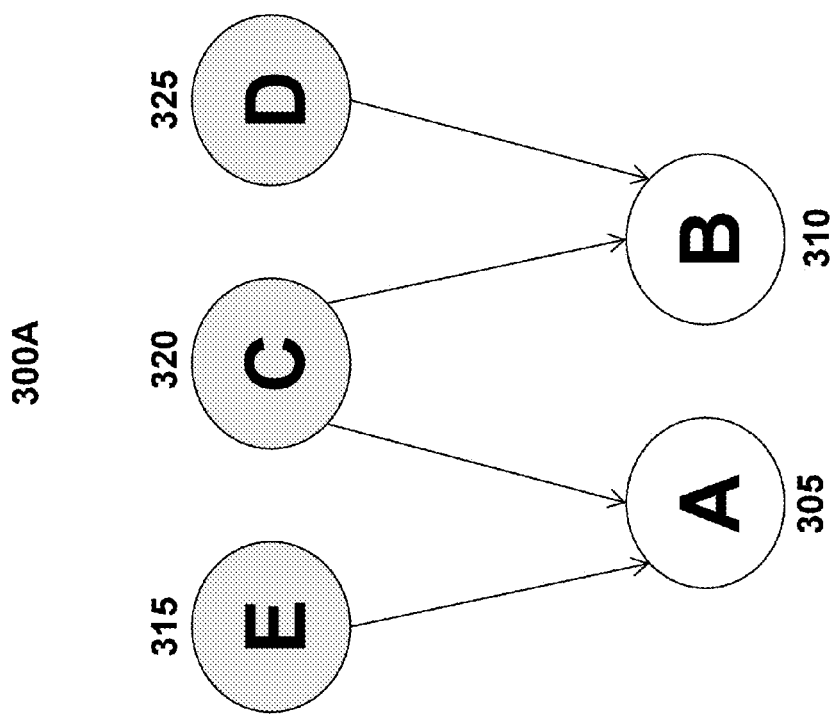
FIGS. 3A and 3B are block diagrams depicting an embodiment of a trust network.

Continuing this example, suppose that the path length L=1 and the users are associated in the manner seen in FIG. 3A. FIG. 3A depicts an embodiment of a trust network. In FIG. 3A, users A-E are each represented with nodes 305, 310, 315, 320, and 325 respectively. Furthermore, in this example, assume that the intrinsic reputation value of the users, I(u), are as follows: I(A)=I(B)=2 and I(E)=I(C)=I(D)=5. Then, for user A $$N^+(A) = \left( \sum_{i=0}^{|T^{1+}(A)|} \frac{\max(I(t_i^{1+}) - I(uA), 0)}{(K-1)|T^-(t_i^{1+})|} \right)$$

In this example, since user A 305 has no connections from user A 305 with other users 310-325, $N^-(A)=0$. For the network, consider that K=4 and since $T^{1+}(A)=\{E, C\}$:

$$N(A) = \frac{I(E) - I(A)}{(4-1)|T^-(E)|} + \frac{I(C) - I(A)}{(4-1)|T^-(C)|} = \frac{5-2}{3|\{A\}|} + \frac{5-2}{3|\{A, B\}|} = \frac{3}{3} + \frac{3}{6} = 1.5$$

Therefore, $$R(A)=I(A)+N(A)=2+1.5=3.5$$

In addition, by symmetry, N(B)=N(A)=3.5
Conversely, the reputation decrease may, for example, be of the form:

$$N^-(u) = -\sum_{v \in T^-(u)} \frac{\min((I(v, t) - I(v, t_{uv}), 0)}{K|T^{1+}(u)|}$$

where I(v,t) denotes the intrinsic reputation of user v at time t. In this example, if a user u trusts another user v and then afterwards the intrinsic reputation of v decreases, such as by receiving a negative review, then the network reputation of u likewise decreases.

In some embodiments, the network reputation generator 220 can determine, for each of the first set of online accounts and the second set of online accounts, a respective network reputation score. In some embodiments, the network reputation generator 220 can determine the network reputation score of the first online account using the network reputation scores of each of the first set of online accounts and the second set of online accounts. In some embodiments, the network reputation generator 220 can weigh the network reputation score of each of the first set of the online accounts and the second set of online accounts according to a function of time.

The digital reputation score generator 230 can generate, for the first online account of the user, a digital reputation score using the intrinsic reputation score of the user and the network reputation score of the user. For example, the digital reputation score generator 230 can determine the digital reputation score based on the sum of the intrinsic reputation score of the user and the network reputation score of the user, using the following form:

$$R(u)=I(u)+N(u)$$

where R denotes digital reputation score, N denotes network-based reputation, and I denotes intrinsic-based reputation for user u. In some embodiments, the digital reputation score generator 230 can update the digital reputation score responsive to determining that a network reputation score of an online account of the first set of online accounts has decreased.

The digital reputation score generated by the digital reputation score generator 230 can exhibit a certain number of properties. First, the sole additive source of reputation score in the trust network may be the intrinsic reputation score. That is, in a network where the intrinsic reputation score is zero for every user v in the network, the digital reputation score may also be zero. Second, loops in the network may not be dominated by stationary distribution artefacts. While the digital reputation gathered by one user is expected to increase linearly with the number of incoming links from other users, the marginal contributions by such other users to the reputation of the user may be inversely proportional to the number of people trusted by the user.

Referring to FIG. 3B, FIG. 3B depicts a block diagram of an embodiment of a trust network. In FIG. 3B, a random surfer in the trust network may get stuck in the loop created by node C 340 and D 345, thereby producing a degenerated stationary visit distribution such that $\{P(A)=P(B)=0, P(C)=P(D)=0.5\}$. One approach may be to tweak the algorithm so that such loops in the network do not become overrepresented. In the present approach, however, since one user may contribute to the digital reputation score of another user only once, there may be no significant loop effects. Lastly, the digital reputation score of a user decreases with more outgoing links in the trust network. This close neighborhood effect, however, may not propagate through the network, because after the decrease occurs, the users with whom the user has directly trusted in the tree may be considered accountable.

Figure 4:
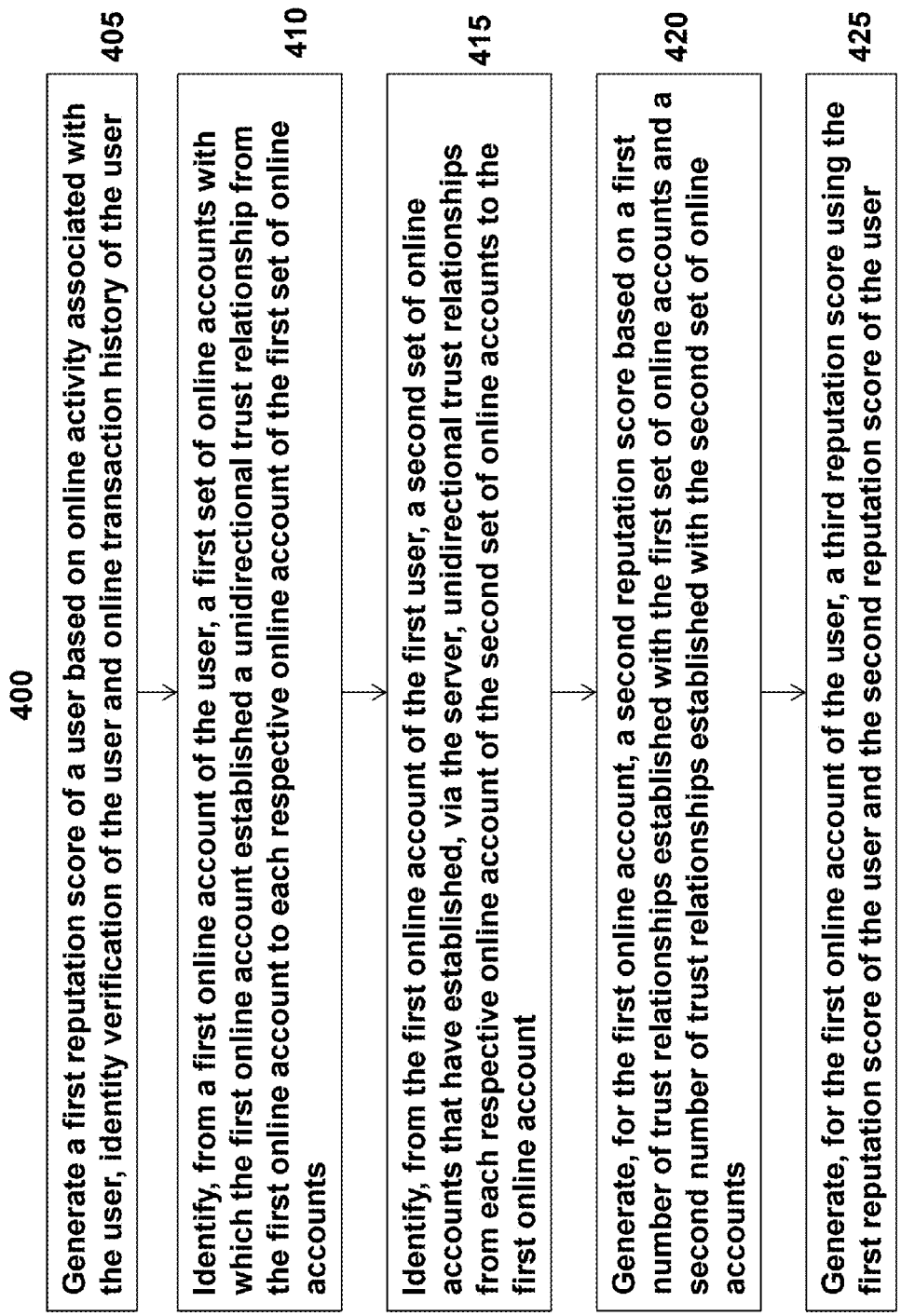
FIG. 4 is a flow chart of a method for generating a digital reputation score in accordance with an embodiment.

Referring now to FIG. 4, FIG. 4 is a flow diagram depicting a method 400 for generating digital reputation scores. The functionality described herein in the method 400 can be performed by any one or more components system 100 depicted in FIGS. 1A-1D such as one or more of the servers 106*a-n*, or any one or more components of system 200 depicted in FIG. 2. In brief overview, the server of the reputation scoring system can generate a first reputation score of a user based on online activity associated with the user, identity verification of the user and online transaction history of the user (BLOCK 405). The server can identify, from a first online account of the user, a first set of online accounts with which the first online account established a unidirectional trust relationship from the first online account to each respective online account of the first set of online accounts (BLOCK 410). The server can identify from the first online account of the first user, a second set of online accounts that have established, via the server, unidirectional trust relationships from each respective online account of the second set of online accounts to the first online account (BLOCK 415). The server can generate for the first online account of the user, a second reputation score based on a first number of trust relationships established with the first set of online accounts and a second number of trust relationships established with the second set of online accounts (BLOCK 420). The server can generate, for the first online account of the user, a third reputation score using the first reputation score of the user and the second reputation score of the user (BLOCK 425).

In further detail, the server can generate a first reputation score of a user based on online activity with the user (BLOCK 405). The first reputation score of a user may represent the intrinsic reputation score of the user. In some embodiments, the intrinsic reputation score of the user may be a sum of an online activity score, identity score, and transaction score. In some embodiments, the intrinsic reputation score of the user may be a weighted sum of an online activity score, identity score, and transaction score. In some embodiments, the system 120 can maintain a plurality of online accounts in a database 240. In some embodiments, the server can identify one or more other accounts maintained by one or more other servers. For example, if a user maintains an account on FACEBOOK, LINKEDIN, TWITTER, and EBAY, the server can identify the accounts on the servers of FACEBOOK, LINKEDIN, TWITTER, and EBAY as belonging to and maintained by that user. In some embodiments, the server can determine, using information associated with the one or more other accounts, the online activity score used to generate the intrinsic reputation score. The online activity score can be based on the online activity related to a user.

In some embodiments, the server can determine a number of online accounts with which each of the one or more other accounts has interacted. In some embodiments, the server can access the length of time for which the one or more other accounts have been established from the one or more accounts maintained by the one or more other servers. In some embodiments, the server can determine the length of time for which the one or more other accounts have been established by accessing the date that the one or more other accounts have been established from the one or more other servers.

In some embodiments, the server can apply a slow increasing function to the determined length of time or the number of online actions with which an online account has interacted to count-measure high-variance in the determined length of time or the number of online actions across different online accounts. In some embodiments, the server can use a slow increasing function of the number of accounts associated with the user to determine the online activity score. In some embodiments, the server can apply the slow increasing function to the first reputation score. In some embodiments, the server can apply the slow increasing function to one or more of the online activity score, identity score, and transaction score.

In some embodiments, the server can identify a domain name of an email address provided by the user. In some embodiments, the server can determine that the domain name belongs to an entity that satisfies a predetermined criteria. The predetermined criteria can specify types of entities, such as universities, corporations, or other servers 106a-n. In some embodiments, the server can, responsive to determining that the domain name belongs to an entity that satisfies the predetermined criteria, generate an identity score used to generate the intrinsic reputation score. The identity score may represent the identity measure of a user in the intrinsic reputation score determination. In some embodiments, the second component score may be dependent on the verifiability of the online account associated with the user.

In some embodiments, the server can establish or otherwise confirm the identity of a particular online user. In some embodiments, the server can confirm the identity of a particular online user by comparing features of an image included in a government-issued ID with features of an image received from the user. In some embodiments, the server can receive a first image of a government-issued ID of the user. A government-issued ID can include a passport, driver's license, fishing license, military IDs, or any other suitable identification issued by a government with a face appearing on at least one side. In some embodiments, the government-issued ID of the user can include the user's face. In some embodiments, the server can identify, from the government-issued ID, data representative of the face of the user. For example, once the government-issued ID is scanned, the server can identify the face of the user on a government-issued ID by using pattern recognition algorithms such as principal component analysis, linear discriminate analysis, and feature identification analysis, among others. In some embodiments, the server can receive, via a video file, a second image. In some embodiments, the second image can include the face of the user. In some embodiments, the server can compare features of the user's face from the first image to features of the face of the user included in the second image. For example, once the first image and the second image has been acquired, the server can compare the features of the user's face from the first image to the features of the second image using feature detection algorithms and then applying nearest neighbor algorithms to determine the similarity of the features of the user's face between the first image and the second image. In some embodiments, the server can increase a value of a second component score, responsive to determining that the use's face included in the first image matches the face of the user in the second image.

In some embodiments, the server can determine a transactions score for the intrinsic reputation score based on online transactions performed by the user. Online transactions can include, for example, purchases of goods or services, returns, and reviews and ratings of such transactions, among others. In some embodiments, the server can receive data corresponding to online accounts of the users maintained by a plurality of other servers 106a-n corresponding to other entities. The data can include data representative of one or more online transactions performed by the user. In some embodiments, the server can determine, using the received data, the transactions score to generate the intrinsic reputation score. For example, a user that has mostly favorable reviews regarding the user's sales of goods to others may have a higher transactions score than a user with average reviews. In contrast, a user that has mostly negative reviews regarding the user's sale of goods to others (such as descriptions of the user's poor quality or fraudulent transactions) may have a lower transactions score than a user with average reviews.

The server can identify, from a first online account of the user, a first set of online accounts with which the first online account established a unidirectional trust relationship from the first online account to each respective online account of the first set of online accounts (BLOCK 410). In some embodiments, the reputation scoring system may establish a unidirectional trust relationship from the first online account to the first set of online accounts in response to the reputation scoring system receiving one or more requests to establish a unidirectional trust relationship from the first online account to each of the first set of online accounts. The unidirectional trust relationships from each respective online account of the second set of online accounts of the first online account can be defined to include relationships between natural persons. The server can identify an account of the first online user and determine a number of second users with which the user has established a unidirectional trust relationship. The server can establish unidirectional trust relationships from the first user to a second user responsive to receiving a request to establish a unidirectional trust relationship from the first user.

The server of the reputation scoring system can identify, from the first online account of the first user, a second set of online accounts that established unidirectional trust relationships from each respective online account of the second set of online accounts to the first online account (BLOCK 415). The server can identify an account of the first online user and determine, from the account of the first online user, a number of second users that have established, via the server, a unidirectional trust relationship from the respective second user to the first user. The server can establish unidirectional trust relationships from the respective second users to the first user in response to receiving a request to establish a unidirectional trust relationship from the respective second user.

The server can generate, for the first online account of the user, a second reputation score based on a first number of trust relationships established with the first set of online accounts and a second number of trust relationships established with the second set of online accounts (BLOCK 420). The second reputation score may represent the score of the user based on the user's network reputation. In some embodiments, the server can determine the second reputation score based on the reputation increase and reputation decrease of the user.

In some embodiments, the server can determine, for each of the first set of online accounts and the second set of online accounts, a respective second reputation score. In some embodiments, the server can determine the second reputation score of the first online account using the second reputation scores of each of the first set of online accounts and the second set of online accounts. In some embodiments, the server can weigh the second reputation score of each of the first set of the online accounts and the second set of online accounts according to a function of time.

The server can generate, for the first online account of the user, a third reputation score using the first reputation score of the user and the second reputation score of the user (BLOCK 425). For example, the server can determine the third reputation score based on the sum of the first reputation score of the user and the second reputation score of the user. In some embodiments, the server can update the third reputation score responsive to determining that a second reputation score of an online account of the first set of online accounts has decreased.

Figure 5:
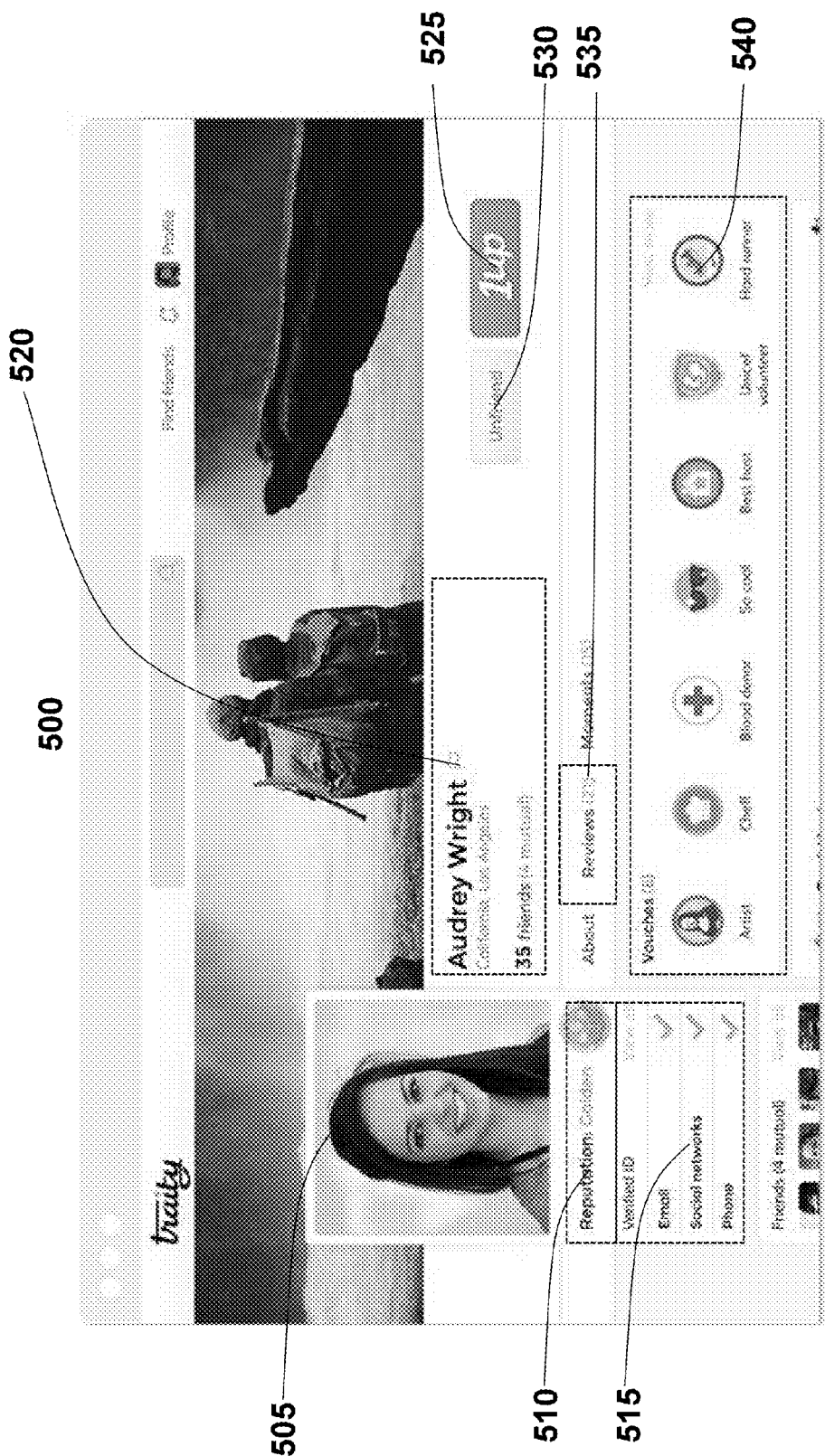
FIG. 5 is a depiction of an embodiment of a graphical user interface.

Referring now to FIG. 5, FIG. 5 is a depiction of an embodiment of a graphical user interface 500. The graphical user interface 500 can include user photo 505, a reputation indicator 510, one or more verification indicators 515, short biography 520, one-up button 525, unfriend button 530, link to reviews 535, and one or more vouch indicators 540, among others. The user photo 505 can include a picture of the user. The reputation indicator 510 can include an indication of the reputation of the user. The reputation of the user can include a numerical score, numerical range, and verbal classification (as depicted), among others. The one or more verification indicators 515 can include the various types of verification that the user has registered. For example, in FIG. 5, the user has been verified via email, social networks, and smartphone. The short biography 520 can include a name of the user, location of the user, and number of friends, among others. The short biography 520 can also include a link for more information about the user. The one-up button 525 can be used to create a connection with the user or increase the total reputation of the user, among others. The unfriend button 530 can be used to sever the connection with the user or decrease the total reputation of the user, among others. The link to reviews 535 can be used to display ratings or rankings earned by the user on other social media. The one or more vouches 540 can include a list of vouches or trust relationships from other users of the trust network. In general, the more vouches 540 that a user has, the higher total reputation score of the user is.

While the invention has been particularly shown and described with reference to specific embodiments, it should be understood by those skilled in the art that various changes in form and detail may be made therein without departing from the spirit and scope of the invention described in this disclosure.

What is claimed is:

1. A method of generating a digital reputation score, comprising:

generating, by a server, a first reputation score of a first user based on online activity associated with the first user, identity verification of the first user and online transaction history of the first user;

receiving, by the server, a first plurality of requests from a first online account of the first user to establish unidirectional trust relationships with a first set of online accounts corresponding to a first set of users, the first online account and the first set of online accounts maintained by the server;

establishing, by the server, responsive to receiving the plurality of requests from the first online account, for the first online account, a unidirectional trust relationship from the first online account to each of the first set of online accounts;

receiving, by the server, a second plurality of requests from a second set of online accounts corresponding to a second set of users to establish unidirectional trust relationships with the first online account corresponding to the first user, the second set of online accounts maintained by the server;

establishing, by the server, responsive to receiving the second plurality of requests from the second set of online accounts, for the first online account, a plurality of unidirectional trust relationships from the second set of online accounts to the first online account, each of the unidirectional trust relationships from the second set of online accounts to the first online account established from a respective online account of the second set of online accounts to the first online account;

generating, by the server, for the first online account of the first user, a second reputation score based on a first number of unidirectional trust relationships established from the first online account to each of the first set of online accounts and a second number of unidirectional trust relationships established from the second set of online accounts to the first online account;

generating, by the server, for the first online account of the first user, a third reputation score using the first reputation score of the first user and the second reputation score of the first user;

identifying, by the server, from the second set of online accounts, a second online account corresponding to a second user that is included in the second set of online accounts;

generating, by the server, for the second online account of the second user, a fourth reputation score based on i) online activity associated with the second user, ii) identity verification of the second user, and iii) online transaction history of the second user;

generating, by the server, for the second online account of the second user, the fifth reputation score based on i) a third number of unidirectional trust relationships established from the second online account to each of a third set of online accounts and ii) a fourth number of unidirectional trust relationships established from a fourth set of online accounts to the second online account, the third set of online accounts including the first online account corresponding to the first user;

generating, by the server, for the second online account of the second user, a sixth reputation score of the second user based on the fourth reputation score and the fifth reputation score;

receiving, by the server, an update on at least one of the online activity associated with the first user, the identity verification of the first user or the online transaction history of the first user;

adjusting, by the server, the first reputation score and the third reputation score of the first user responsive to receiving the update; and adjusting, by the server, responsive to adjusting the third reputation score of the first user, the fourth reputation score of the second user based on the unidirectional trust relationship from the second online account to the first online account.

2. The method of claim 1, wherein generating the first reputation score includes:
identifying, by the server, one or more other accounts maintained by one or more other servers;
determining, using information associated with the one or more other accounts, a first component score used to generate the first reputation score.

3. The method of claim 2, wherein determining, using information associated with the one or more other accounts, the first component score used to generate the first reputation score includes:
determining a length of time for which the one or more of the other accounts have been established; and
determining a number of online accounts with which each of the one or more other accounts has interacted.

4. The method of claim 3, further comprising generating the first component score includes applying a slow increasing function to the determined length of time or the number of online actions with which an online account has interacted to counter-measure high variance in the determined length of time or the number of online actions across different online accounts.

5. The method of claim 1, wherein generating the first reputation score includes:
identifying, by the server, a domain name of an email address provided by the first user;
determining, by the server, that the domain name belongs to an entity that satisfies a predetermined criteria; and
responsive to determining that the domain name belongs to an entity that satisfies a predetermined criteria, generating a second component score used to generate the first reputation score.

6. The method of claim 1, wherein generating the first reputation score includes:
receiving, by the server, a first image of a government-issued ID of the first user that includes the first user's face;
identifying, from the government-issued ID, data representative of the face of the first user;
receiving, by the server, via a video file, a second image including the face of the first user;
comparing, by the server, features of the first user's face from the first image to features of the face of the first user included in the second image; and
increasing a value of a second component score responsive to determining that the first user's face included in the first image matches the face of the first user in the second image.

7. The method of claim 1, wherein generating the first reputation score includes:
receiving, by the server via one or more networks, data corresponding to online accounts of users maintained by a plurality of other servers corresponding to other entities, the data representative of one or more online transactions performed by the user;
determining, using the received data, a third component score to generate the first reputation score.

8. The method of claim 1, further comprising:
determining, for the first set of online accounts and the second set of online accounts, second reputation scores; and
determining the second reputation score of the first online account using the second reputation scores of the first set of online accounts and the second set of online accounts.

9. The method of claim 8, wherein the second reputation scores of the first set of online accounts and the second set of online accounts are weighted according to a function of time.

10. The method of claim 8, further comprising updating the third reputation score responsive to determining that a second reputation score of an online account of the first set of online accounts has decreased.

11. A system of generating a digital reputation score, comprising:
a server including a hardware processor and memory maintaining a plurality of online accounts in a database stored on the memory, the server configured to:
generate a first reputation score of a first user based on online activity associated with the first user, identity verification of the first user and online transaction history of the first user;
receive a first plurality of requests from a first online account of the first user to establish unidirectional trust relationships with a first set of online accounts corresponding to a first set of users, the first online account and the first set of online accounts maintained by the server;
establish, responsive to receiving the plurality of requests from the first online account, for the first online account, a unidirectional trust relationship from the first online account to each of the first set of online accounts;
receive a second plurality of requests from a second set of online accounts corresponding to a second set of users to establish unidirectional trust relationships with the first online account corresponding to the first user, the second set of online accounts maintained by the server;
establish, responsive to receiving the second plurality of requests from the second set of online accounts, for the first online account, a plurality of unidirectional trust relationships from the second set of online accounts to the first online account, each of the unidirectional trust relationships from the second set of online accounts to the first online account established from a respective online account of the second set of online accounts to the first online account;
generate, for the first online account of the user, a second reputation score based on a first number of unidirectional trust relationships established from the first online account to each of the first set of online accounts and a second number of unidirectional trust relationships established from the second set of online accounts to the first online account;
generate, for the first online account of the first user, a third reputation score using the first reputation score of the first user and the second reputation score of the first user;
identify, from the second set of online accounts, a second online account corresponding to a second user that is included in the second set of online accounts;
generate, for the second online account of the second user, a fourth reputation score based on i) online activity associated with the second user, ii) identity verification of the second user, and iii) online transaction history of the second user;
generate, for the second online account of the second user, the fifth reputation score based on i) a third number of unidirectional trust relationships established from the second online account to each of a third set of online accounts and ii) a fourth number of unidirectional trust relationships established from a fourth set of online accounts to the second online account, the third set of online accounts including the first online account corresponding to the first user;

generate, for the second online account of the second user, a sixth reputation score of the second user based on the fourth reputation score and the fifth reputation score;

receive, an update on at least one of the online activity associated with the first user, the identity verification of the first user or the online transaction history of the first user;

adjust, the first reputation score and the third reputation score of the first user responsive to receiving the update; and adjust, responsive to adjusting the third reputation score of the first user, the fourth reputation score of the second user based on the unidirectional trust relationship from the second online account to the first online account.

12. The system of claim 11, wherein to generate the first reputation score, the server is configured to:

identify, one or more other accounts maintained by one or more other servers;

determine, using information associated with the one or more other accounts, a first component score used to generate the first reputation score.

13. The system of claim 12, wherein to determine, using information associated with the one or more other accounts, the first component score used to generate the first reputation score, the server is configured to:

determine a length of time for which the one or more of the other accounts have been established; and determine a number of online accounts with which each of the one or more other accounts has interacted.

14. The system of claim 13, wherein the server is further configured to generate the first component score by applying a slow increasing function to the determined length of time or the number of online actions with which an online account has interacted to counter-measure high variance in the determined length of time or the number of online actions across different online accounts.

15. The system of claim 11, wherein to generate the first reputation score, the server is configured to:

identify a domain name of an email address provided by the first user;

determine that the domain name belongs to an entity that satisfies a predetermined criteria; and responsive to determining that the domain name belongs to an entity that satisfies a predetermined criteria, generate a second component score used to generate the first reputation score.

16. The system of claim 11, wherein to generate the first reputation score, the server is configured to:

receive a first image of a government-issued ID of the first user that includes the first user's face;

identify, from the government-issued ID, data representative of the face of the first user;

receive, via a video file, a second image including the face of the first user;

compare features of the first user's face from the first image to features of the face of the first user included in the second image; and increase a value of a second component score responsive to determining that the first user's face included in the first image matches the face of the first user in the second image.

17. The system of claim 11, wherein to generate the first reputation score, the server is configured to:

receive, via one or more networks, data corresponding to online accounts of users maintained by a plurality of other servers corresponding to other entities, the data representative of one or more online transactions performed by the first user; and determine, using the received data, a third component score to generate the first reputation score.

18. The system of claim 11, wherein the server is further configured to:

determine, for the first set of online accounts and the second set of online accounts, second reputation scores; and determine the second reputation score of the first online account using the second reputation scores of the first set of online accounts and the second set of online accounts.

19. The system of claim 18, wherein the second reputation scores of the first set of online accounts and the second set of online accounts are weighted according to a function of time.

20. The system of claim 18, wherein the server is further configured to update the third reputation score responsive to determining that a second reputation score of an online account of the first set of online accounts has decreased.

* * * * *